G. CULBERTSON.
GRAIN SHOCKER.
APPLICATION FILED MAY 14, 1914.
1,166,329.
Patented Dec. 28, 1915.
3 SHEETS—SHEET 1.
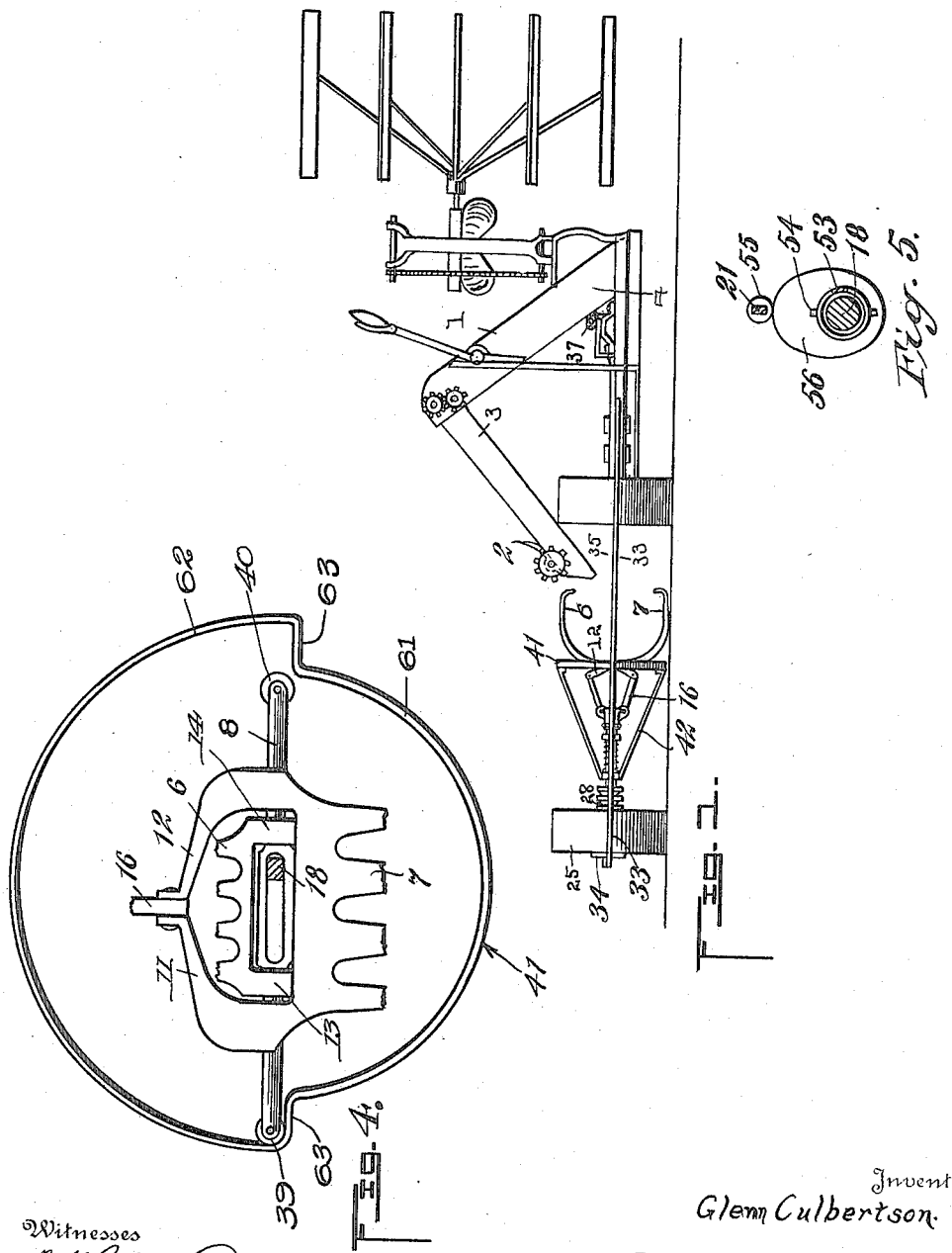
Witnesses
Inventor
Glenn Culbertson.
Attorney

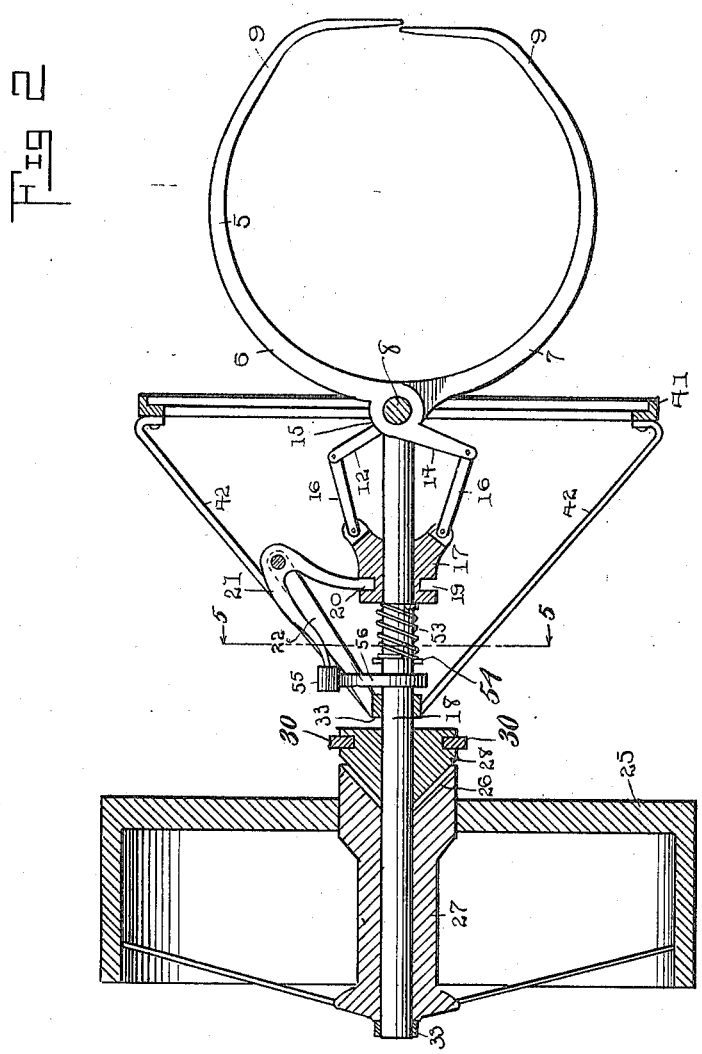

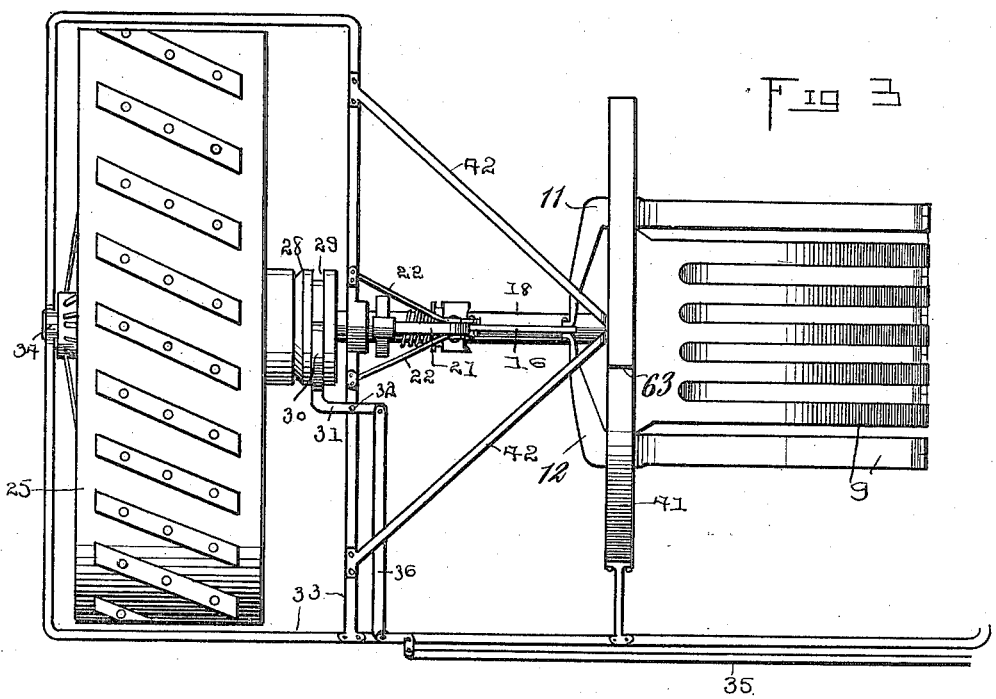

UNITED STATES PATENT OFFICE.

GLENN CULBERTSON, OF FRANKFORT, INDIANA.

GRAIN-SHOCKER.

1,166,329. Specification of Letters Patent. Patented Dec. 28, 1915.

Application filed May 14, 1914. Serial No. 838,547.

*To all whom it may concern:*

Be it known that I, GLENN CULBERTSON, a citizen of the United States, residing at Frankfort, in the county of Clinton and State of Indiana, have invented certain new and useful Improvements in Grain-Shockers, of which the following is a specification.

This invention relates to harvesting machines and more particularly to a shocker for attachment to a binder or grain harvesting machine.

The primary object of this invention is the provision of bundle or sheaf retaining members which are attached to a binder and positioned so as to receive the sheaves immediately after they are deposited or ejected from the knotting mechanism of the binder, for retaining them until a sufficient number has accumulated for forming a shock, after which the retaining members are actuated for automatically positioning the sheaves in upright positions upon the surface of the field.

Another object of this invention is the provision of means associated with the sheaf retaining members for firmly seating the shocks upon the ground so as to prevent them from falling over, and also suitable means for returning the sheaf retaining members to a receiving and retaining position adjacent the knotter of the binder.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is a view showing the improved shocker in elevation and applied to a grain harvester such as is commonly known as a binder. Fig. 2 is a central longitudinal sectional view through the improved grain shocker. Fig. 3 is a top plan view. Fig. 4 is an end view showing parts thereof broken away. Fig. 5 is a section on the line 5—5 of Fig. 2.

Referring more particularly to the drawings, 1 designates a grain harvester of the type commonly known as a binder and such as is used in the cutting or harvesting of grains such as wheat, oats or the like wherein the heads of the grain are carried upon straw stems and the harvester 1 has the usual type of tying and knotting mechanism 2, which is positioned above the deck 3 as is common in the construction of harvesters of this nature. The grain after it has been cut passes upwardly over the conveyer 4 to the deck 3 where it is tied into sheaves, which sheaves are deposited or ejected from the deck 3 into the retaining member 5.

The retaining member 5 is constructed of two members 6 and 7, which members are mounted upon a shaft 8 and they have a plurality of arcuate prongs 9 formed thereupon and extending toward the deck 3, which prongs are normally held in open position so as to receive and retain the sheaves of grain straw therein.

The members 6 and 7 have arms 11, 12, 13 and 14 formed thereupon and extending in opposite directions to the prongs 9, the arms 11 and 12 being formed upon the member 7, while the arms 13 and 14 are formed upon the member 6. These arms extend outwardly from the bearings 15 which are formed upon the members 6 and 7 and receive the shaft 8, and they curve inwardly having their terminal ends positioned in parallel relation with each other and connected to links 16. The portions of the members 6 and 7, which are mounted upon the shaft 8, and have the arms and prongs projecting outwardly therefrom are positioned one within the other as is clearly shown in Fig. 4 of the drawings, so as to permit of the pivotal movement of the members upon the shaft 8, without one of them retarding the action of the other.

The links 16 are pivotally connected to a sleeve 17, which sleeve is slidably keyed upon a shaft 18 and has an annular groove 19 formed therein near one end thereof, in which groove the end 20 of the actuating arm 21 is seated. The actuating arm 21 is pivotally supported by a brace 22.

The shaft 18 has a traction wheel 25 mounted upon its outer terminal end, which traction wheel has a clutch cone bearing 26 formed in the inner end of the hub 27 of the same, and the traction wheel 25 is rotatably mounted upon the shaft 18, so as to rotate free thereupon when the clutch cone 28 is not in engagement with the clutch cone bearing 26. The clutch cone 28 is keyed upon the shaft 18 outwardly of the sleeve 17 and it is provided with an annular groove 29 in which groove are seated the arcuate arms 30 of the lever 31.

The lever 31 is pivotally connected at 32 to the frame 33, which frame extends transversely about the traction wheel 25, having a bearing 34 formed thereon for the reception of the terminal end of the shaft 18, and it is connected in any suitable manner to the frame of the harvesting machine 1. The lever 31 has connection with a rod 35 through the medium of a link 36. The rod 35 extends longitudinally along the portion of the frame 33 which extends toward the binder frame, and it has connection with a manually operable lever 37 which is mounted upon the frame of the binder in a position for convenient actuation by the person seated upon the binder.

The shaft 8 has its terminal ends bifurcated and rollers 39 and 40 rotatably seated in the bifurcated ends thereof, which rollers travel upon the inner surface of a substantially circular track 41. The circular track 41 is positioned vertically, and it is supported by rods 42, which rods are in turn attached to the frame 33 in any suitable manner such as is shown in Figs. 2 and 3 of the drawings.

The shaft 18 has a spiral spring 53 coiled thereabout, one end of which spiral spring abuts the outer end of the collar 17, while the other end engages a pin or collar 54 which is carried by the shaft 18, and the spring is connected to the pin 54 so that it will be tensioned upon the rotation of the shaft in one direction.

The free terminal end of the actuating arm 21 has a roller 55 rotatably mounted thereupon, which roller has peripheral engagement with a cam 56, which cam is rigidly carried by the shaft 18 for rotation therewith, for actuating the arm 21 upon its pivotal point for sliding the sleeve 17 upon the shaft 18.

The track 41 as clearly illustrated in Fig. 4 of the drawings constitutes two sections 61 and 62, which are of different diameters, and the section 62 being of increased diameter with respect to the section 61. The sections 61 and 62 are connected by straight portions 63, which straight portions will provide an abrupt drop to the shaft 8 and the sheaf carrying mechanism carried thereby for firmly setting the sheaves upon the ground for forming a shock.

In the operation of the improved shocker, or bundle carrier the bundles or sheaves of grain are deposited in the retaining member 5, between the arcuate prongs 9 of the members 6 and 7 and when the desired number of sheaves for making a shock are positioned within the retainer 5, the lever 31 is actuated through the medium of the manually actuated lever 37 and the clutch cone 28 is moved into the clutch cone bearing 26 so that the shaft 18 will rotate synchronously with the traction wheel 25 and this will cause the rotary movement of the shaft 8 about the track 41 with the shaft 18 as a central axis thereof. The friction of the engagement or guiding of the ends of the shaft will be materially decreased by the rollers 39 and 40. The rotation of the shaft 8 about the shaft 18 as an axis therefor will rotate or move the members 6 and 7 from a vertical to a horizontal position so that the sheaves retained by the arcuate prongs 9 thereof will be moved from a horizontal to a vertical position for depositing upon the ground to form a shock. During the rotation of the shaft 18, the roller 55, carried by the bell crank 21 will travel about the periphery of the cam 56, thereby rocking the bell crank 21 and sliding the sleeve or spider 17 longitudinally upon the shaft 18, which will move the arcuate sheaf carrying arms 6 and 7 outwardly, spreading them, so that when they reach a vertical position, the sheaves may be deposited therefrom, butts downward upon the ground. The spring 53, acts for automatically returning the spider or sleeve 17 and the bell crank 21 to their normal positions, when the roller 55 engages the narrow portion of the cam 56.

From the foregoing description, taken in connection with the accompanying drawings, the advantages of the construction and of the method of operation of the improved grain shocker will be readily apparent to those skilled in the art to which this invention appertains and while in the foregoing description the principle of the operation of this invention has been described, together with various features of construction, it is to be understood that minor features of construction, combination, and arrangement of parts may be altered to suit practical conditions, provided such alterations are comprehended within the scope of what is claimed.

What is claimed is:—

1. In a grain shocker, a pair of sheaf receiving members having a plurality of arcuate sheaf-receiving arms, a shaft pivotally supporting said members, a second shaft rotatably supported transversely to said first-named shaft, a bull wheel rotatably mounted upon said second named shaft, said sheaf-receiving members normally resting in a horizontal sheaf receiving position, clutch means for rotating said second-named shaft synchronously with the rotation of said bull wheel for moving said sheaf-receiving members from a horizontal sheaf-receiving position to a vertical sheaf-depositing position, a substantially circular track, rollers mounted upon the ends of said first-named shaft and engaging said track for guiding the movement of said sheaf-receiving members.

2. In a grain shocker, a pair of sheaf-receiving members having a plurality of arcuate sheaf-receiving arms, a shaft pivotally supporting said members, a second shaft rotatably supported transversely of said first-named shaft, a bull wheel rotatably mounted upon said second named shaft, said sheaf-receiving members normally resting in a horizontal sheaf-receiving position, clutch means for rotating said second-named shaft synchronously with the rotation of said bull wheel for moving said sheaf-receiving members from a horizontal sheaf-receiving position to a vertical sheaf depositing position, a substantially circular track, rollers mounted upon the ends of said first-named shaft and engaging said track for guiding the movement of said sheaf-receiving members, and an abrupt offset portion formed in said track, said rollers dropping abruptly over said offset portion for administering an abrupt drop to said sheaf receiving members.

3. In a grain shocker, a pair of sheaf-receiving members having a plurality of arcuate sheaf-receiving arms, a shaft pivotally supporting said members, a second shaft rotatably supported transversely to said first-named shaft, a bull wheel rotatably mounted upon said second-named shaft, said sheaf-receiving members normally resting in a horizontal sheaf-receiving position, clutch means for rotating said second-named shaft synchronously with the rotation of said bull wheel for moving said sheaf-receiving members from a horizontal sheaf-receiving position to a vertical sheaf depositing position, a substantially circular track, rollers mounted upon the ends of said first-named shaft and engaging said track for guiding the movement of said sheaf-receiving members, and means operable by the rotation of said second-named shaft for spreading said sheaf-receiving members when in a vertical sheaf-depositing position.

4. In a grain shocker, a pair of sheaf-receiving members having a plurality of arcuate sheaf-receiving arms, a shaft pivotally supporting said members, a second shaft rotatably supported transversely to said first-named shaft, a bull wheel rotatably mounted upon said second-named shaft, said sheaf-receiving members normally resting in a horizontal sheaf-receiving position, clutch means for rotating said second-named shaft synchronously with the rotation of said bull wheel for moving said sheaf-receiving members from a horizontal sheaf receiving position to a vertical sheaf-depositing position, a substantially circular track, rollers mounted upon the ends of said first-named shaft and engaging said track for guiding the movement of said sheaf-receiving members, and means operable by the rotation of said second-named shaft for spreading said sheaf-receiving members when in a vertical sheaf-depositing position, and an abrupt offset portion formed in said track, said rollers dropping abruptly over said offset portion for administering an abrupt drop to said sheaf-receiving member.

5. In a grain shocker, a pair of sheaf-receiving members, a shaft pivotally supporting and connecting said sheaf-receiving members, an auxiliary shaft, a bull wheel rotatably mounted upon said auxiliary shaft, said sheaf-receiving members normally resting in a horizontal sheaf-receiving position, clutch means for rotating said auxiliary shaft synchronously with the rotation of said bull wheel for moving said sheaf-receiving member from a horizontal sheaf-receiving position to a vertical sheaf-depositing position, a frame extending about said bull wheel, a substantially circular track supported by said frame, rollers mounted upon the ends of said first-named shaft and engaging said track for guiding the travel of said sheaf-receiving members, arms formed upon said sheaf-receiving members, a spider slidably carried by said auxiliary shaft, links connecting said arms and said spider, a bell crank pivotally supported by said frame, a cam seated upon said auxiliary shaft, a roller carried by said bell crank and engaging said cam for rocking said bell crank for operating said spider and arms for spreading said sheaf-receiving members when in a sheaf-delivering position.

6. In a grain shocker, a pair of sheaf-receiving members, a shaft pivotally supporting and connecting said sheaf-receiving members, an auxiliary shaft, a bull wheel rotatably mounted upon said auxiliary shaft, said sheaf-receiving members normally resting in a horizontal sheaf-receiving position, clutch means for rotating said auxiliary shaft synchronously with the rotation of said bull wheel for moving said sheaf-receiving member from a horizontal sheaf-receiving position to a vertical sheaf-depositing position, a frame extending about said bull wheel, a substantially circular track supported by said frame, rollers mounted upon the ends of said first-named shaft and engaging said track for guiding the travel of said sheaf-receiving members, arms formed upon said sheaf-receiving members, a spider slidably carried by said auxiliary shaft, links connecting said arms and said spider, a bell crank pivotally supported by said frame, a cam seated upon said auxiliary shaft, a roller carried by said bell crank and engaging said cam for rocking said bell crank for operating said spider and arms for spreading said sheaf-receiving members when in a sheaf-delivering position, and means for automatically returning said sheaf-receiving members to a closed position when moved into a sheaf-receiving position.

7. In a grain shocker, a pair of sheaf-receiving members, a shaft pivotally supporting and connecting said sheaf-receiving members, an auxiliary shaft, a bull wheel rotatably mounted upon said auxiliary shaft, said sheaf-receiving members normally resting in a horizontal sheaf-receiving position, clutch means for rotating said auxiliary shaft synchronously with the rotation of said bull wheel for moving said sheaf-receiving member from a horizontal sheaf-receiving position to a vertical sheaf-depositing position, a frame extending about said bull wheel, a substantially circular track supported by said frame, rollers mounted upon the ends of said first-named shaft and engaging said track for guiding the travel of said sheaf-receiving members, arms formed upon said sheaf-receiving members, a spider slidably carried by said auxiliary shaft, links connecting said arms and said spider, a bell crank pivotally supported by said frame, a cam seated upon said auxiliary shaft, a roller carried by said bell crank and engaging said cam for rocking said bell crank for operating said spider and arms for spreading said sheaf-receiving members when in a sheaf-delivering position, means for automatically returning said sheaf-receiving members to a closed position when moved into a sheaf-receiving position, an abrupt offset portion formed in said track, said rollers dropping abruptly over said offset portion for administering an abrupt drop to said sheaf receiving members.

In testimony whereof I affix my signature in presence of two witnesses.

GLENN CULBERTSON.

Witnesses:
L. J. CURTIS,
J. P. MERRIMAN.

Copies of this patent may be obtained for five cents each, by addressing the "Commissioner of Patents, Washington, D. C."